March 5, 1946.                B. E. SHERRILL                2,396,133
                              MAGNETIC COMPASS
                         Original Filed May 20, 1943
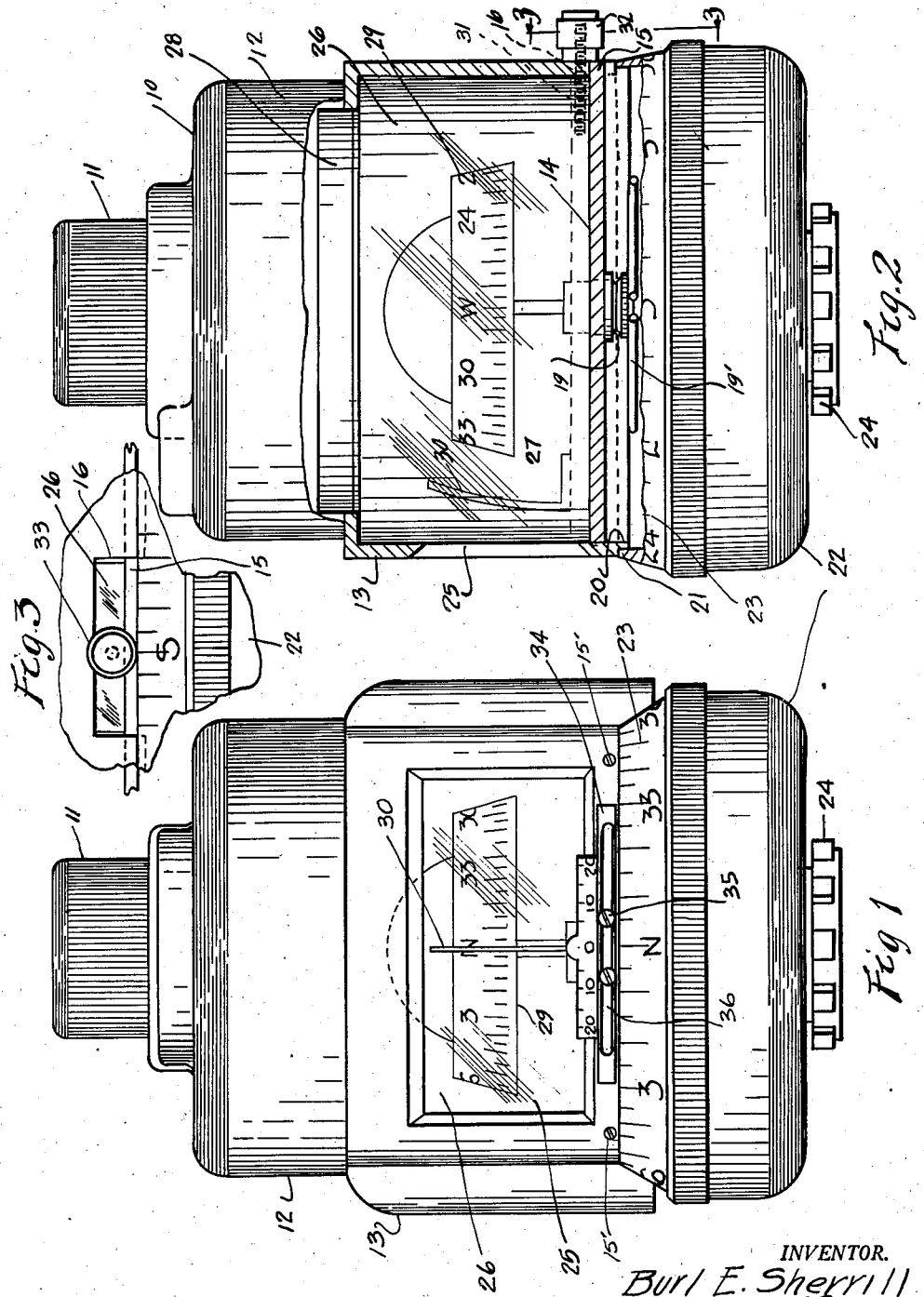
INVENTOR.
Burl E. Sherrill
BY Clarence E. Moody
His Attorney Patented Mar. 5, 1946

2,396,133

UNITED STATES PATENT OFFICE 2,396,133

MAGNETIC COMPASS

Burl E. Sherrill, Peru, Ind.

Continuation of application Serial No. 487,721, May 20, 1943. This application April 14, 1944, Serial No. 531,058

3 Claims. (Cl. 33—223)

This invention relates to certain novel improvements in magnetic compasses and more specifically to a simple and expeditious arrangement of parts for mounting the compass bowl within the compass housing whereby the same may be adjusted to assure proper compass directions, and has for its principal object the provision of an improved construction of this character which will be highly efficient in use and economical in manufacture.

Among the salient objects of this invention is the provision of a magnetic compass having a compass bowl adjustably mounted within a compass housing, the arrangement being such that both the lubber line of the compass and the compass card may be adjusted to proper compass position whereby a proper compass reading may be obtained.

Other objects will appear hereinafter.

The invention consists in the novel combination and arrangement of parts to be hereinafter described and claimed.

The invention will be best understood by reference to the accompanying drawing showing the preferred form of construction, and in which:

Fig. 1 is a front elevational view of the compass embodied in my invention;

Fig. 2 is a reverse side part sectional elevational view of the same;

Fig. 3 is a fragmentary elevational view taken substantially on line 3—3 of Fig. 2.

The present invention constitutes a continuation of that shown in my pending application, Serial No. 487,721, filed May 20, 1943, for Letters Patent on a Magnetic compass, which became Patent No. 2,375,329, issued May 8, 1945.

The drawing of this present application shows the preferred form of construction by which the several objects of my invention are accomplished. Only so much of the magnetic compass has been shown and will be hereinafter described, as is necessary for an understanding of the new features of this present invention.

In this connection the magnetic compass includes a housing 10 on the top of which is mounted a screw cap 11 enclosing a compensator unit (not shown). The upper or head assembly 12 of the compass contains other compensator mechanism (not shown). The intermediate portion 13 of the housing 10 is substantially cylindrical in cross section and has a bottom wall 14 in the form of a disc and secured to the intermediate portion of the housing 10 by means of suitable screw elements 15'. This bottom wall 14 has a key section 15 which fits into the lower region of a slot 16 formed in the intermediate portion 13. Depending from this bottom wall 14 is the post 19 which supports the quadrantal correctors 19', shown and described in my pending application hereinbefore referred to.

Extending below this wall 14 is a skirting rabbeted as at 20 to receive the edge 21 of a rotatable base 22 having an indicating ring 23, the base 22 serving as an enclosure for the quadrantal correctors and being carried by the post 19 and attached thereto through and by the medium of a finger knob 24.

Formed in the intermediate portion 13 of the housing 10 opposite the elongated slot 16 is a sight opening or window 25. My improved compass bowl is indicated at 26 and comprises a cylindrical body 27 of transparent material and a cap or upper section 28 serving as an expander to compensate for expansion of the fluid within the compass bowl 26. This upper section 28 is of a smaller diameter than the compass bowl 26 and projects into the head portion 12 of the housing 10. The compass bowl 26 rests upon the bottom wall 14. It contains the compass rose or card 29 similar in construction to that disclosed in my pending application hereinbefore referred to. Confined within and supported from the compass bowl and adapted to be properly positioned within the sight opening or window 25 is a lubber line 30. This lubber line 30 is so properly positioned by manually adjusting the compass bowl 26. This is accomplished by associating with the compass bowl in a fixed position with respect thereto, a threaded screw element 31. The exterior end of this screw element 31 projects through the elongated slot 16 and has threaded thereon a thumb nut 32. By rotation of the finger button 32 upon the screw element 31, the finger button 32 may be brought away from contact with the wall of the intermediate portion 13, and in this position of the thumb nut 32 the compass bowl may be adjusted relative to the intermediate portion 13 to properly position the lubber line within the sight opening or window 25. After this adjustment has been made, the thumb nut 32 is screwed upon the screw element 31 into bearing engagement with the adjacent wall 33 of the intermediate portion 13, thus securing the compass bowl in its proper fixed adjusted position.

Under normal conditions, the lubber line 30 is disposed centrally with respect to a vertical axis through the sight opening or window 25 and the indicating plate 34 adjustably mounted on the front face of the intermediate portion 13 by a pair of screw elements 35 which pass through a horizontal slot 36 formed in the plate 34. Both the plate and the compass bowl may be adjusted so as to bring about their proper position with respect to the sight opening or window 25.

To assemble the compass bowl within the compass housing the operator first unscrews the knob 24 from the post 19. This will permit removal of the base 22. Next the operator removes the screws 15', which permits the removal of the bottom wall 14 of the intermediate portion 13. Then, by loosening the thumb nut 32, the entire compass bowl and rose, together with the lubber line, may be removed from within the compass housing 10. Thus, it is apparent that this simplicity of parts results in convenient and expeditious assembly.

While I have illustrated and described the preferred form of construction for carrying my invention into effect, this is capable of variation and modification without departing from the spirit of the invention. I therefore do not wish to be limited to the precise details of construction set forth, but desire to avail myself of such variations and modifications as come within the scope of the appended claims.

Having thus described my invention, what I claim as new and desire to protect by Letters Patent is:

1. A compass comprising an intermediate housing portion having a removable bottom wall, means for removably connecting the bottom wall to the intermediate portion, said intermediate portion providing an elongated slot, a compass bowl arranged in said intermediate portion upon said bottom wall, a thread-bearing element carried by said compass bowl and movable in said elongated slot, a thumb nut having threaded engagement with said thread bearing element and adapted when in a predetermined position to have clamping engagement with the adjacent wall of said intermediate portion to fix said compass bowl in an adjusted position within said intermediate portion.

2. A compass comprising an intermediate housing portion of cylindrical formation in cross section and having a sight opening formed on one side thereof and an elongated slot formed in an opposite side, a compass bowl within said intermediate portion, means supporting said compass bowl within said intermediate portion, a thread bearing member carried by the compass bowl and movable in said elongated slot, a thumb nut threaded upon said thread bearing member and adapted to have bearing engagement with an adjacent wall of the intermediate portion for releasably connecting said compass bowl in a fixed position within said intermediate portion.

3. A magnetic compass comprising a body portion providing a compass bowl chamber and having a wall portion provided with an elongated slot, a compass bowl mounted in said chamber, a bottom wall for said chamber and supporting said compass bowl for rotation within said chamber and having a key portion engageable in said slot to hold said bottom wall against rotation relative to said compass bowl, a threaded member carried by the compass bowl and movable in said slot, and a thumb nut threaded on said threaded member and adapted to have clamping engagement with said wall to releasably fix said compass bowl in a fixed position within said chamber.

BURL E. SHERRILL.